United States Patent [19]

Kodaka et al.

[11] Patent Number: 5,066,103
[45] Date of Patent: Nov. 19, 1991

[54] HELICOID THREADED TUBE OF SYNTHETIC RESIN AND LENS BARREL COMPRISING IT

[75] Inventors: Yoshiro Kodaka, Tokyo; Kiyonobu Takabayashi, Kawasaki, both of Japan

[73] Assignee: Nikon Corporation, Tokyo, Japan

[21] Appl. No.: 441,561

[22] Filed: Nov. 27, 1989

[30] Foreign Application Priority Data

Nov. 29, 1988 [JP] Japan ................................. 63-299658

[51] Int. Cl.$^5$ .............................................. G02B 7/02
[52] U.S. Cl. ..................................... 359/823; 359/819
[58] Field of Search ..................... 350/574, 245–257, 350/427–430, 319, 320; 285/174–177, 382–385, 355, 390, 423; 411/307–312, 176

[56] References Cited

U.S. PATENT DOCUMENTS

| | | | |
|---|---|---|---|
| 2,581,690 | 1/1952 | Mozhle et al. | 411/308 |
| 3,233,258 | 2/1966 | Neuschotz | 411/176 |
| 3,454,070 | 7/1969 | Phipard, Jr. | 411/307 |
| 3,687,183 | 8/1972 | Rohm | 411/307 |
| 4,317,693 | 3/1982 | Reed | 285/423 |
| 4,397,484 | 8/1983 | Miller | 285/175 |
| 4,582,350 | 4/1986 | Okajina | 285/390 |
| 4,805,991 | 2/1989 | Arai et al. | 350/252 |
| 4,822,138 | 4/1989 | Takase | 350/252 |
| 4,842,464 | 6/1989 | Green | 411/307 |

FOREIGN PATENT DOCUMENTS 62-22128  5/1987  Japan .
62-265608 11/1987 Japan ................................. 350/252

Primary Examiner—Bruce Y. Arnold
Assistant Examiner—Thong Nguyen
Attorney, Agent, or Firm—Shapiro and Shapiro

[57] ABSTRACT

A helicoid threaded tube formed by molding a synthetic resin in a split mold, comprises: a hollow cylindrical member of synthetic resin; primary threads integrally formed with the cylindrical member and helically extending on the inner or outer surface thereof and having a cross section which is substantially trapezoidal at all portions thereof except split line segments thereof where the matching surfaces of the split mold intersect with the cylindrical member; and relief thread portions centered at the split line segments and continuously extending from the primary threads with the width gradually narrowing, the relief thread portions having a height substantially equal to that of the primary threads. In such threaded tube, at those portions of its threads (relief portions) within which molding burrs will tend to occur during molding, the threads have a gradually narrowing width and a constant height. This configuration of the threads ensures that engaged male and female helicoid threaded tubes formed in accordance with the invention can achieve a smooth relative sliding movement while substantially maintaining mechanical strength. A lens barrel may incorporate such threaded tubes.

6 Claims, 4 Drawing Sheets

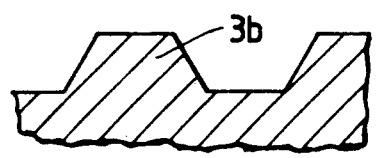
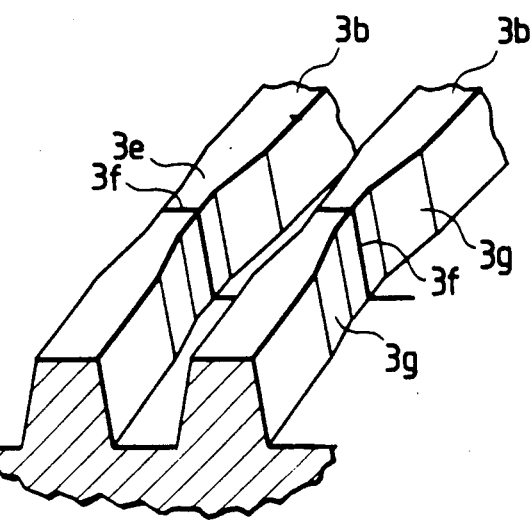
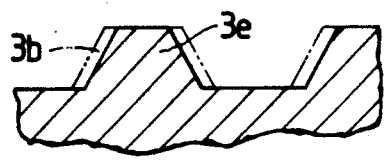
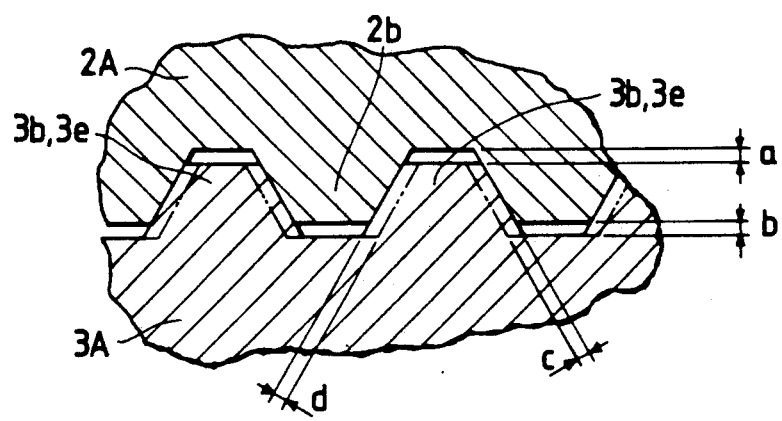

HELICOID THREADED TUBE OF SYNTHETIC RESIN AND LENS BARREL COMPRISING IT

BACKGROUND OF THE INVENTION

1. Field of the Invention

The present invention relates in general to lens barrels, and in particular to helicoid threaded members forming part of a lens barrel.

2. Related Background Art

Lens barrels usually have a structure for allowing the optical system to be movable in the axial direction. In many cases, the structure comprises helicoid threaded tubes which are connected together by means of their threads of substantially trapezoidal cross section formed helically on the inner or outer surfaces thereof.

In the past, helicoid threaded tubes of this type were formed of a metallic material through high precision machining. Recently, with the development of plastics molding techniques, it has become possible to produce plastics tubes of this type having threads integrally formed therewith by molding, whereby reduction in cost and weight of the tubes has been achieved.

These helicoid threaded tubes, however, suffer from a problem in that burrs inevitably occur during molding at portions thereof corresponding to matching surfaces of the parts of the metal split mold used to form them. When plastics articles are formed with the use of a split mold, burrs will occur depending on various conditions such as the accuracy of the split mold, errors in matching of the mold halves, and abrasions in the mold. The occurrence of such burrs would virtually be unavoidable even if the above-mentioned conditions are controlled carefully. It takes a long working time, and therefore necessitates a substantial cost, to remove burrs formed in the thread.

To solve these problems, the threads of a prior art plastics helicoid threaded tube, integrally formed with the tube, are configured such that the height and width of the threads decrease gradually in the portion on the inner or outer surface of the tube where burrs usually occur so that the portions of the threads having gradually decreasing height and width can avoid engagement with the corresponding threads of another threaded tube when these tubes are connected together by means of their threads, whereby the tubes can smoothly move or slide on each other.

FIGS. 12-16 show prior helicoid threaded tubes having threads which are partly configured in a manner as described immediately above. Specifically, FIG. 12 is a cross sectional view of a male helicoid threaded tube, and FIG. 13 is a cross sectional view of a corresponding female helicoid threaded tube.

The male threaded tube 30 shown in FIG. 12 has threads in an outer peripheral portion thereof which are shown between an interrupted and the outer contour. Two grooves 3c and 3d, diametrically opposed to each other, are straight keyways which serve to prevent the rotation of the male threaded tube 30 when the female helicoid threaded tube connected thereto is rotated to move the male tube 30 forward or backward along the optical axis. As shown in FIG. 12, the height of the threads decreases gradually in portions 34 and adjacent regions, where the threads intersect with parting lines on the helicoid threaded tube to which the matching surfaces A, B, C and D of the split mold parallel to the optical axis are positioned, so that molding burrs, if any, in these portions will not engage with the threads of the female helicoid threaded tube.

FIG. 14 shows the cross section, taken along a transverse plane which is parallel to the optical axis, of the threads at the split line portions 34. The threads are substantially lower and narrower in these portions than in other portions M, shown in FIG. 12, where the mold matching surfaces are not positioned. The thread height in the portions M is indicated by an interrupted line in FIG. 14.

The female helicoid threaded tube 32 shown in FIG. 13 has threads which are shown lying between an interrupted line and its inner contour. As shown, the threads have a height which decreases gradually in split line portions 35 and adjacent regions, which portions 35 are formed by making six radially diverging matching surfaces E, F, G, H, I and J of the split mold intersect with the threads, so that molding burrs, if any, will not engage with the threads on the male helicoid threaded tube.

In the split line portions 35 the threads have a cross sectional shape which is substantially identical to that of FIG. 14, and are substantially lower and narrower in these portions than in other portions N shown in FIG. 13 where the mold matching surfaces are not positioned.

In the prior art male and female helicoid threaded tubes respectively formed as a single piece member by molding, in which the threads are reduced in both height and width in the split line portions where the mold matching surfaces are positioned, so that the top and side surfaces of such thread portions of one threaded tube can avoid engagement with the relative positions of the threads on the other threaded tube, the thread portions 34 and 35 of reduced height and width depends on the relative angular positions of the threaded tubes. The thread portions of reduced height and width are hereinafter called "relief thread portions" or simply "relief portions".

In FIG. 15, in which the male and female helicoid threaded tubes 30 and 32 are simply shown superposed, the threads of these tubes engage together in angular positions or ranges K1, K2, K3, K4, K5 and K6. In the other angular ranges, however, at least part of the threads are not in engagement with corresponding threads.

When a mechanical impact is applied to one of the helicoid threaded tubes being in such a relative position, the sides of the thread portions engaging together will be subjected to enhanced stress. Helicoid threaded tubes of plastics have a lower modulus of elasticity than those of metal, and therefore have a stronger tendency to be deformed under stress than metallic threaded tubes. For this reason, the engaging portions of the threads are then deformed and the so deformed portions will interfere with the relative movement of the connected helicoidal threaded tubes.

To avoid such problem, the thickness of the threaded tubes should be increased so that deformation of the threads can be prevented, or the angle of relief of the relief portions of the threads, which are not in engagement with corresponding thread portions, should be made smaller. Unfortunately, a larger thickness of the tubes is associated with a larger diameter of the lens system mounted on the tubes. Further, to make the angle of relief smaller, the height of the threads must be steeply decreased from their effective outer diameter 31 or from effective inner diameter 33 in the relief portions 34 and 35, making rough the outer or inner contour of the threaded tubes. This roughness also causes the action of rotating the connected tubes to be not smooth, and consequently skill or experience is necessitated to precisely position the lens system. One of the male and female helicoid threaded tubes may be made of metal and the other of plastics, the metal one being provided with threads formed by machining. In this case, the threads of the tube of plastics must still have relief portions where molding burrs tend to occur. The existence of the relief portions necessarily causes a decrease in the total area of contact between engaging threads and also decreases the mechanical strength of the threads of plastics. Thus, the threads of these tubes made of different materials may be likely to be disengaged, as in the case of tubes both of which are made of plastics.

Further, in the relative position shown in FIG. 15, the parting line segments of one helicoid threaded tube are located in angular positions different from those in which the parting line segments of the other helicoid threaded tube. At least one relief portion of one tube will be aligned with one relief portion of the other tube when the relative position of the tubes is changed by a small extent of relative rotation. Since the height of the relief portions of the threads is lower than the other portions of threads, there will be a clearance where relief portions of the threads on one tube are aligned or registered with, i.e. located at the same angular positions of, relief portions of the engaging threads on the other tube connected to the one tube. Rays of light can pass through such clearance, as shown in FIG. 16. If the helicoid threaded tubes are used in a photographic lens barrel, then there is a danger that leakage light passing through such clearance can reach the photosensitive film surface, degrading the picture taken.

SUMMARY OF THE INVENTION

An object of the present invention is to provide an improved helicoid threaded tube formed by molding plastics, which is highly resistant to deforming effect of stress, will not cause a malfunction due to disengagement of threads thereon when subjected to a mechanical impact, and which does not have a danger of leakage of light through the helicoid threads.

Another object of the present invention is to provide a lens barrel having incorporated therein a helicoid threaded tube formed by molding plastics, which tube is highly resistant to deforming effect of stress, and does not have a danger of leakage of light through the helicoid threads.

To achieve the above objects, the helicoid tube of the present invention, formed by molding a synthetic resin by means of a split mold, comprises: a hollow cylindrical member of synthetic resin; primary threads integrally formed with the cylindrical member and helically extending on the inner or outer surface thereof and having a cross section which is substantially trapezoidal at all portions thereof except split line segments thereof where the matching surfaces of the split mold intersect with the cylindrical member; and relief portions centered at the split line segments and continuously extending from the primary threads with the width gradually narrowing, the relief portions having a height substantially equal to that of the primary threads.

In accordance with another aspect of the present invention, a lens barrel comprises a male helicoid threaded tube and a female helicoid threaded tube which are engageable together by means of the threads thereof, at least one of the male and female helicoid threaded tubes having threads which are formed by said primary threads and relief portions.

In the helicoid threaded tube of the present invention, and at those portions of its threads (i.e. relief portions) within which molding burrs will tend to occur during molding because of the presence of the matching surfaces of the split mold, the threads have a gradually narrowing width and a constant height. This configuration of the threads ensures that engaged male and female helicoid threaded tubes formed in accordance with the invention can achieve a smooth relative siding movement thereof while substantially maintaining the mechanical strength to withstand stresses exerted on the sides of the threads. In addition, this configuration can prevent leakage of light through the engaged threads irrespective of the relative angular positions of the parting line relief portions of the male and female helicoid threaded tubes since the height of the threads is constant throughout the length of the threads.

BRIEF DESCRIPTION OF THE DRAWINGS

These and other objects, features and effects of the present invention will become more apparent from the following detailed description which should be read in conjunction with the accompanying drawings, in which:

FIG. 4 is an enlarged fragmentary sectional view showing the profile of ordinary portions of the helical threads not including split line segments formed by the split mold;

FIG. 5 is an enlarged fragmentary cross sectional view showing the profile of relief portions of the helical threads in split line segments formed by the split mold;

FIG. 6 is an enlarged fragmentary perspective view of the thread portion shown in FIG. 5;

FIG. 7 is an enlarged fragmentary cross sectional view showing portions of engaged threads of the helicoid threaded tubes shown in FIG. 1;

DESCRIPTION OF PREFERRED EMBODIMENTS

Figure 1:
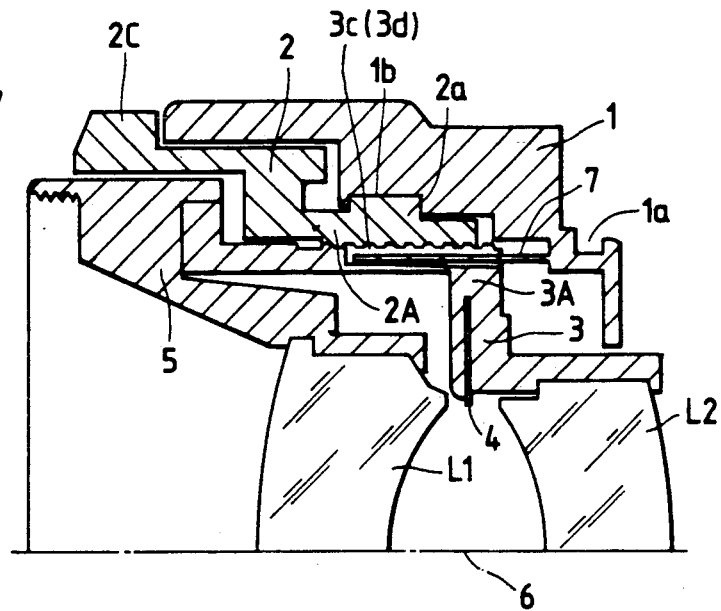
FIG. 1 is a fragmentary longitudinal sectional view of a photographic lens barrel having incorporated therein a first embodiment of a helicoid threaded tube according to the present invention.

FIG. 1 shows a photographic lens barrel incorporating therein a first embodiment of the invention, in which parts of the lens barrel located below the optical axis 6 are not shown.

The lens barrel of FIG. 1 comprises cylindrical tubes, namely, a fixed lens tube 1, focusing tube 2, and lens carrier tubes 3 and 5.

Focusing tube 2 and lens carrier tube 3 have helicoid thread segments which are engageable together to allow movement of lenses L1 and L2 along the optical axis for focusing purposes.

Fixed lens tube 1 has an engagement portion 1a for removably attaching such tube 1 to a camera body (not shown). Fixed lens tube 1 also is provided in its inner surface with another engagement portion 1b which engages with a lug 2a of focusing tube 2 on top and side surfaces so as to prevent focusing tube 2 from moving in a thrust direction, i.e. along the optical axis.

Focusing tube 2 is made of plastics, and is provided in its inner surface with a thread tube segment 2A which is engageable with lens carrier tube 3 which carries a lens L2 thereon. This thread tube segment 2A is engaged with a corresponding thread tube segment 3A of lens carrier tube 3. Focusing tube 2 is provided, at one end thereof, with an annular focusing operation segment 2c for allowing manual focusing operation.

Like focusing tube 2, carrier tube 3 is made of plastics, and it has thread tube segment 3A on its outer surface. It is provided on its inner surface with an annular variable diaphragm 4. Lens carrier tube 5 carrying lens L1 thereon is fixedly mounted to lens carrier tube 3 at the front end by means of screws (not shown). That is, these lens tubes 3 and 5 are adapted to move together as a single body.

Fixed lens tube 1 has mounted thereto straight keys 7 extending in the direction of the optical axis, which keys 7 are engaged in straight key ways 3c and 3d (shown in FIG. 2) formed in lens carrier tube 3. Lens carrier tube 3, engaged with the thread tube segment 2A of focusing tube 2, is prevented from rotation by straight keys 7. Lens carrier tubes 3 and 5 will thus move together forward or backward along the optical axis as focusing tube 2 is rotated about the optical axis in one or the opposite direction for focusing purposes.

Figure 2:
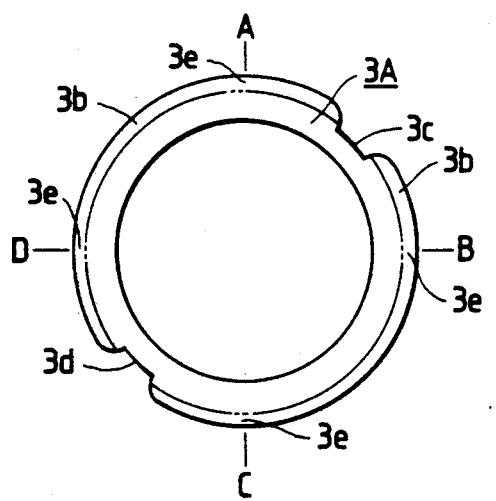
FIG. 2 is a schematic plan view showing the threads of a male helicoid threaded tube shown in FIG. 1.
Figure 3:
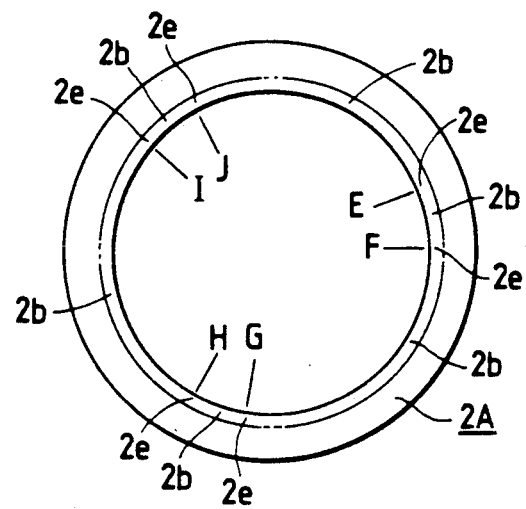
FIG. 3 is a schematic plan view showing the threads of a female helicoid threaded tube shown in FIG. 1.

FIGS. 2 and 3 show cross sections of male and female thread segments 3A and 2A, respectively, of lens carrier tube 3 and focusing tube 2, respectively.

Male thread segment 3A shown in FIG. 2 will now be described in detail. The annular region of thread segment 3A bounded by an interrupted line and the outer contour is the region where threads 3b and 3e (to be described in more detail) are formed.

The cross sectional profile of thread 3b is generally trapezoidal, as shown in FIG. 4. The cross sectional profile of thread 3e is different in split lines and adjacent regions, the split lines being formed at locations where mold matching surfaces A, B, C and D of the split mold, which are parallel to the optical axis, intersect the threads. Specifically, threads 3e have a constant height throughout their entire lengths but have a narrower width in the split lines and adjacent regions (see "3e" in FIG. 5) than in the other locations (see "3b" in FIG. 4). For the purpose of comparison, the thread profile 3b of FIG. 4 is shown by an interrupted line in FIG. 5.

FIG. 6 is an enlarged fragmentary perspective view of the above-mentioned thread portions 3b and 3e. For explanation, only part of the helical thread is shown.

Molding burrs 3f projecting slightly from the surface are formed where mold matching surfaces (A-D) are located. In regions 3g adjacent to molding burrs 3f, namely, relief thread portions, the thread has a gradually decreasing width. In FIG. 6, the thread portions corresponding to FIGS. 5 and 4 are designated by reference characters 3e and 3b, respectively.

Next, female thread tube segment 2A of FIG. 3 will be described. The annular region of this thread tube segment 2A bounded by an interrupted line and the inner contour is the region where threads 2b and 2e are formed.

Threads of FIGS. 2 and 3 are substantially identical in shape, but threads 2b and 2e are formed in the inner surface of thread tube segment 2A. Specifically, threads 2e at locations where mold matching surfaces E, F, G, H, I and J of the split mold are positioned are substantially identical in profile with threads 3e shown in FIG. 5, and threads 2b, which are spaced apart from these locations where mold matching surfaces are positioned, are of the same profile as threads 3b shown in FIG. 4. Thread portions adjacent to mold matching surfaces E, F, G, H, I and J have a gradually narrowing width, like thread portions 3g of FIG. 6.

Next, effects of engagement of the above-mentioned male and female thread tube segments 3A and 2A will be described.

FIG. 7 is a longitudinal sectional view showing focusing tube 2 and lens carrier tube 3 having their respective thread tube segments 2A and 3A engaged together. In this figure, thread tube segment 3A of lens carrier tube 3 is located below thread tube segment 2A of lens carrier tube 2. Threads 2b on thread tube segment 2A indicated by a solid line are of the normal thread profile, while threads 3e on thread tube segment 3A indicated by an interrupted line are of the thread profile found at locations where mold matching surfaces A-D of the split mold are positioned.

Threads 2b and 3b, like ordinary helicoid threads, engage together at their sides and have radial clearances between the tops and bottoms of the threads. It is possible not only to avoid adverse influences of molding burrs on the operation of engaged thread tube segments 2A and 3A but also to improve the mechanical strength of these threaded tube segments when the sizes of these clearances "a" and "b" are made larger than the sum of the height of molding burrs on focusing tube 2 and the height of molding burrs on lens carrier tube 3, and the extents of relief, indicated as "c" and "d", respectively, on the sides where the mold matching surfaces of the split mold are positioned, are made larger than the height of burrs 3f on the threads of male thread tube segment 3A. In other words, effects mentioned immediately above can be achieved by narrowing the thread width in relief portions while maintaining constant the thread height throughout the entire length of the threads.

Improvement in the mechanical strength of these thread tube segments 2A and 3A will hereinafter be described.

Figure 8:
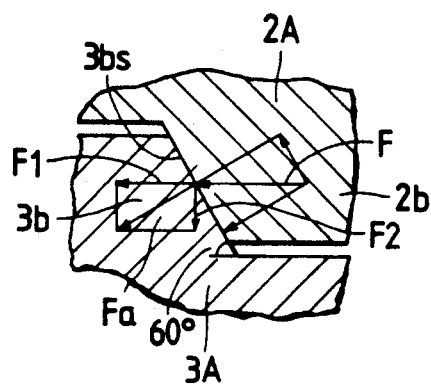
FIG. 8 is an illustration for explaining stresses on the sides of engaging threads.

FIG. 8 shows the engagement of threads 2b and 3b on tube segments 2A and 3A of focusing tube 2 and lens carrier tube 3, respectively. Assuming that a transverse stress F is applied to the engaged portion of male thread 2b in a direction of movement of lenses parallel to the optical axis, from the right hand side in FIG. 8, the force Fa exerted on a side 3bs of thread 3b is the component of the transverse stress F which is normal to the side 3bs. Such force Fa, which can cause the thread to be deformed, can be decomposed into two component forces, i.e. a first component F1 which acts in a direction parallel to the optical axis, and a second component F2 which acts in a radial direction. Assuming now that the inclination of the side 3bs of thread 3b is 60° for purposes of simplicity, the force component F2, which is exerted in a radial direction from the thread 2b on female thread tube 2A against the thread 3b on male thread tube 3A may be expressed as 0.43 F. This means that about half of the force exerted laterally on focusing tube 2 will be converted to a force which presses threads 3b downward in FIG. 8.

Figure 9:
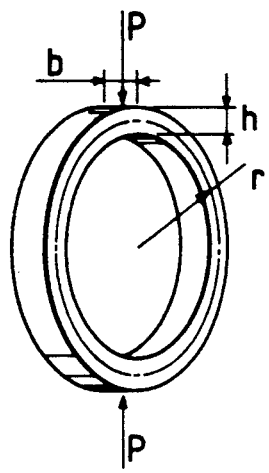
FIG. 9 is an illustration for explaining stresses occurring due to external forces exerted on an outer peripheral surface of a cylindrical tube.

FIG. 9 is a schematic illustration showing external force P exerted on the outer periphery of a straight cylinder. Assuming that the cylinder has a width b, and a wall thickness h, with the "radius", which is the distance from the center axis of the cylinder to the "center line" of the wall thickness, being r, the magnitude of deformation Δ may be expressed by the following known equation:

$$\Delta = \frac{2Pr^3}{EI}\left(\frac{\pi}{8} - \frac{1}{\pi}\right), I = \frac{bh^3}{12},$$

where "E" is the Young's modulus.

The magnitude of deformation Δ is inversely proportional to the third power of the wall thickness "h".

It is in fact difficult to accurately estimate actual deformation of an actual thread tube segment because forces are generally exerted on the tube in different directions and the tube generally has a complex cross sectional configuration, but the above expression generally tells that a force exerted laterally on focusing tube 2 will cause a deformation of the tube whose magnitude is substantially directly proportional to such force and is substantially inversely proportional to the third power of the wall thickness "h".

In particular, it is true that the wall thickness will largely affect the deformation. For this reason, the mechanical strength of threaded tubes will be decreased if both of the width and height of threads are reduced in mold-matching portions and adjacent regions as in conventional threaded tubes, in order to avoid malfunctioning due to molding burrs, which reductions mean a reduction in the effective wall thickness, and therefore the strength, of the tube at such portions or regions. Such reduction in the effective wall thickness will naturally cause the tube to be more likely to be deformed under stress. Further, since the height of the relief thread portions is then substantially lower than that of the other thread portions, the diameter of one tube can become larger than the effective outer diameter of the other tube engaged with the one tube or can become smaller than the effective inner diameter of the other tube engaged with the one tube, with the result that these tubes will be disengaged from each other when the entire body of the one tube is subjected to elastic deformation.

In contrast, in accordance with the present invention, the strength of the thread tube is not so weakened at relief thread portions and therefore its mechanical strength is not so decreased in such portions because the thread height is constant throughout the length of the threads including the relief thread portions. Therefore, tubes arranged in accordance with the present invention will not suffer from disengagement of their engaging threads and resulting malfunctioning.

Figure 10:
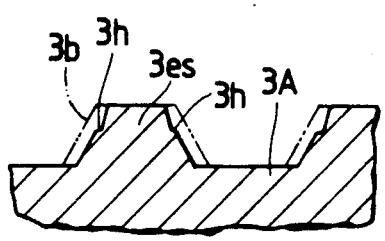
FIG. 10 is an enlarged fragmentary cross sectional view showing the profile of relief portions of the helical threads in split line segments of a second embodiment of the invention.
Figure 11:
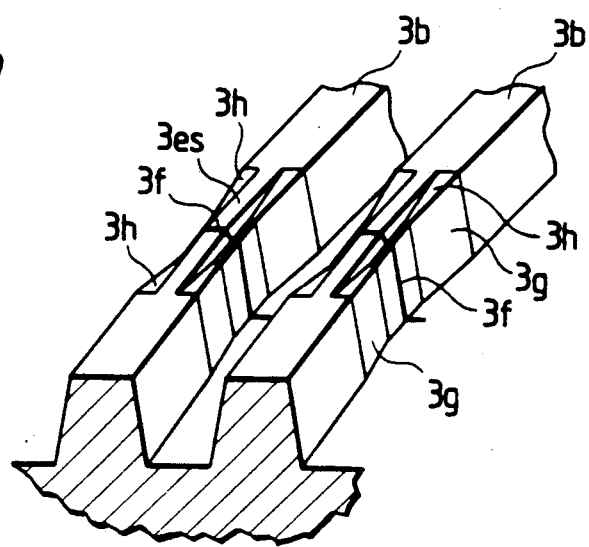
FIG. 11 is an enlarged fragmentary perspective view showing the thread portion of FIG. 10.
Figure 12:
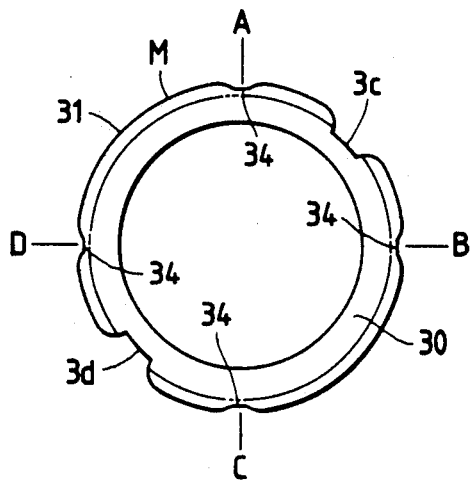
FIG. 12 is a schematic plan view showing a thread portion of a known male helicoid threaded tube formed by means of a split mold.
Figure 13:
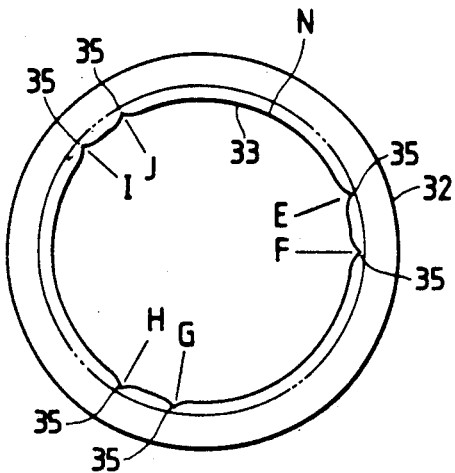
FIG. 13 is a schematic plan view showing a thread portion of a known female helicoid threaded tube formed by means of a split mold.
Figure 14:
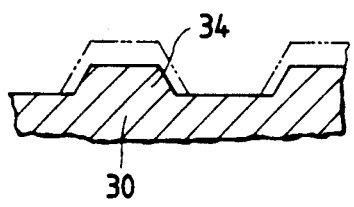
FIG. 14 is an enlarged fragmentary cross sectional view showing the profile of a known relief portion in split line segments of the helicoid threaded tubes of FIGS. 12 and 13.
Figure 15:
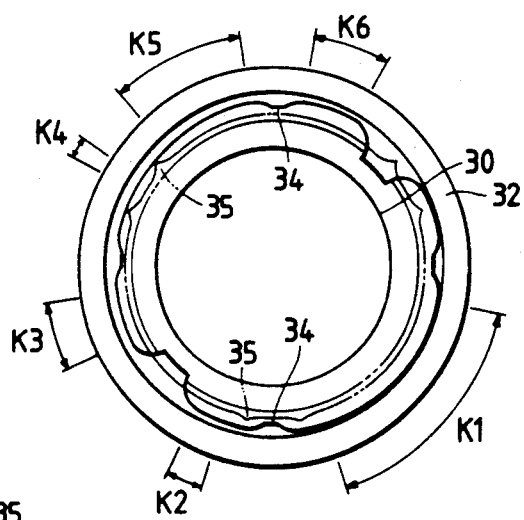
FIG. 15 is a plan view showing the helicoid threaded tubes of FIGS. 12 and 13 engaged together.
Figure 16:
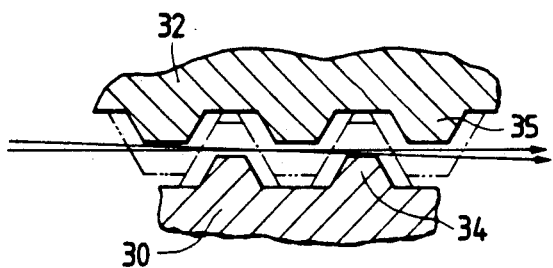
FIG. 16 is a cross sectional view showing the helicoid threaded tubes of FIGS. 12 and 13 engaged together, wherein relief portions of these tubes are aligned or registered.

FIGS. 10 and 11 show a second embodiment of the thread according to the present invention. The embodiment is applied to a lens barrel, which comprises fixed lens tube 1, focusing tube 2, and lens carrier tubes 3 and 5 all of which are identical with those shown in FIGS. 1 through 3 and are therefore not shown in FIGS. 10 and 11 and will not be described again here.

The second embodiment is substantially identical with the first one, except that it has a different configuration of thread. Specifically, FIG. 10 shows the cross sectional profile of threads 3b and 3es on lens carrier tube 3 or male thread tube segment 3A. As in FIG. 10, the thread profile 3b outlined by an interrupted line represents the ordinary thread profile, i.e. that profile which is found in locations not including those where mold matching surfaces of the split mold are positioned, and further additional locations adjacent thereto.

In FIGS. 10 and 11, thread portions 3es outlined by a solid line, where mold matching surfaces are positioned, has a constant height and a reduced width. In the first embodiment, the thread sides are simple inclined surfaces as shown in FIGS. 5 and 6, but in the second embodiment the inclined side surfaces are provided with step portions 3h in the middle thereof. This is to facilitate the machining of relief contours in the metallic mold during preparation of the mold, eventually to improve the machining accuracy, the relief contours in the mold corresponding to burrs 3f on both sides of threads. The profile presented by the first embodiment requires different cutters for cutting both sides of threads or otherwise it requires electric discharge machining, these machining methods requiring substantial labor but with a machining accuracy inferior to that which is attainable with the second embodiment. Each step 3h is only slightly spaced from the top of the thread, so that it will not adversely affect the focusing operation.

In FIG. 10, burrs 3f are not shown at thread portions 3es for purposes of simplicity.

As will be understood from the foregoing, the embodiments of the invention have a constant thread height even in locations of split lines of a split mold are positioned, and therefore they are resistant to deforming effects of stresses. In addition, since the relief thread portions have a constant engaging height when being engaged with threads on the opposite thread tube, which height is equal to that of ordinary thread portions, defective focusing operation due to disengagement of threads on connected threaded tubes can be avoided even if one threaded tube is subjected to mechanical impacts.

What is claimed is:

1. A helicoid threaded tube formed by molding a synthetic resin by means of a split mold having matching surfaces, comprising:
   a hollow cylindrical member of synthetic resin;

primary threads of predetermined height integrally formed with the cylindrical member and helically extending on the inner or outer surface thereof and having a cross section which is substantially trapezoidal at all portions thereof except split line segments thereof where the matching surfaces of the split mold intersect with the cylindrical member; and relief thread portions centered at the split line segments and continuously extending from the primary threads with a gradually narrowing width, the relief thread portions having a height substantially equal to that of the primary threads.

2. The helicoid threaded tube as claimed in claim 1, wherein said primary threads have a top surface of predetermined width and said relief thread portions have a top surface of narrower width than said primary threads, said primary threads and said relief portions having the same inclination on both sides thereof.

3. The helicoid threaded tube as claimed in claim 1, wherein said relief thread portions comprise trapezoidal portions which are lower than said primary threads, and projection top portions which project from said trapezoidal portions to the height of said primary threads.

4. A lens barrel, comprising:
a male helicoid threaded tube and a female helicoid threaded tube which are engageable together by means of the threads thereof, at least one of said male and female threaded tubes comprising:

a hollow cylindrical member of synthetic resin formed by molding a synthetic resin by means of a split mold having matching surface;

primary threads of predetermined height integrally formed with the cylindrical member and helically extending on the inner or outer surface thereof and having a cross section which is substantially trapezoidal at all portions thereof except split line segments thereof where the matching surfaces of the split mold intersect with the cylindrical member; and relief thread portions centered at the split line segments and continuously extending from the primary threads with a gradually narrowing width, the relief thread portions having a height substantially equal to that of the primary threads.

5. The lens barrel as claimed in claim 4, wherein said primary threads have a top surface of predetermined width and said relief thread portions have a top surface of narrower width than said primary threads, said primary threads and said relief portions having the same inclination on both sides thereof.

6. The lens barrel as claimed in claim 4, wherein said relief thread portions comprise trapezoidal portions which are lower than said primary threads, and projecting top portions which project from said trapezoidal portions to the height of said primary threads.

* * * * *